(12) United States Patent
Oh

(10) Patent No.: US 8,464,064 B2
(45) Date of Patent: Jun. 11, 2013

(54) SYSTEM AND METHOD FOR EVALUATING AND CERTIFYING VIDEO PAT SOFTWARE

(75) Inventor: Weon-Geun Oh, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1409 days.

(21) Appl. No.: 11/721,460

(22) PCT Filed: Jul. 21, 2005

(86) PCT No.: PCT/KR2005/002373
§ 371 (c)(1),
(2), (4) Date: Jun. 12, 2007

(87) PCT Pub. No.: WO2006/065017
PCT Pub. Date: Jun. 22, 2006

(65) Prior Publication Data
US 2008/0033896 A1 Feb. 7, 2008

(30) Foreign Application Priority Data
Dec. 13, 2004 (KR) .......................... 10-2004-0105010

(51) Int. Cl.
*H04L 29/06* (2006.01)
(52) U.S. Cl.
USPC .............................. 713/176; 382/100; 714/38
(58) Field of Classification Search
USPC .............................. 382/100; 714/38; 713/176
See application file for complete search history.

(56) References Cited

U.S. PATENT DOCUMENTS

| 6,785,815 | B1 | 8/2004 | Serret-Avila et al. | |
|---|---|---|---|---|
| 6,862,696 | B1 * | 3/2005 | Voas et al. | 714/38 |
| 2002/0164047 | A1 | 11/2002 | Yuval | |
| 2004/0117500 | A1 | 6/2004 | Lindholm | |
| 2004/0194126 | A1 | 9/2004 | Kogure et al. | |
| 2005/0025338 | A1 * | 2/2005 | Zhao et al. | 382/100 |

FOREIGN PATENT DOCUMENTS

| JP | 11-161165 | 6/1999 |
|---|---|---|
| JP | 11-346302 | 12/1999 |
| JP | 2000-165643 | 6/2000 |
| JP | 2001-053949 | 2/2001 |
| JP | 2003-122636 | 4/2003 |
| KR | 2003-0047253 A | 6/2003 |
| KR | 2004-0014942 A | 2/2004 |
| KR | 2004-0024929 A | 3/2004 |
| KR | 2004-0090836 | 10/2004 |

* cited by examiner

*Primary Examiner* — Brandon Hoffman
*Assistant Examiner* — Thong Truong
(74) *Attorney, Agent, or Firm* — Ladas & Parry LLP

(57) ABSTRACT

Provided are a system and method for evaluating and certifying video PAT software, including a module for embedding a related information into the video image data and detecting the embedded information. A receiving module receives video PAT software and a certificate application associated with the video PAT software. A setting module sets an evaluation environment according to use cases of the PAT software received through the receiving module. An embedding module embeds predetermined information into a test video image data using an embedder of the received video PAT software. An attack module attacks the test video image data with the embedded information through various attack tools and generating an attacked video image data. A detecting module detects the embedded information from the attacked video image data by using a detector of the received video PAT software. An evaluating module evaluates statistic information about reliability of the video PAT software from the detected information. A certificate generating module generates a certificate containing the evaluated statistic information.

8 Claims, 4 Drawing Sheets

SYSTEM AND METHOD FOR EVALUATING AND CERTIFYING VIDEO PAT SOFTWARE

TECHNICAL FIELD

The present invention relates to a system and method for evaluating and certifying video PAT (persistent association technologies) software; and, more particularly, to a system and method for evaluating and certifying video PAT software, in which evaluation system and certificate specification for current and future video PAT evaluation and certification are defined and thus users are allowed to select them according to their objects, based on the contents of the certificate of the video PAT.

BACKGROUND ART

With the advance of the Internet and information communication technologies, the contents industry is given much weight in our industries and occupies an important position in terms of quality. Also, because of the development of next-generation information technology (IT) environment, the contents related technologies become complex from a simple component technology and the related technologies tend to be integrated. That is, in the ultra high speed, high capacity, and wired/wireless integration environment, the contents have characteristics of user orientation, realization, portability, and copyright protection. There is a demand for development of new technology for generating/producing, storing/managing, protecting/distributing, and serving these contents.

Specifically, digital contents occupy about 80% (1 hex byte, 1018 bytes) of all contents generated every year and can be copied without loss of the contents. Therefore, when the digital contents are distributed over the Internet, the technology for managing the copyrights of the digital contents is urgently demanded.

Due to these demands, digital rights management (DRM) technology is widely used as the technology for protecting the copyrights of the digital contents. Specifically, PAT (persistent association technologies) is a technology to persistently combine digital contents and contents-related data (information) and it protects the copyrights of the contents by embedding or extracting the copyright information to or from the digital contents.

The PAT includes a watermarking, a fingerprinting, and so on. A PAT associated with digital video media is called a video PAT.

Depending on the objects, the PAT uses basic technologies of various fields, such as a signal processing, an image processing, a computer graphics, a communication, a computer science, a recognition science, and so on. According to the original objects, the PAT must secure robustness against intentional/unintentional damage, modification and removal of the embedded information.

At this point, a variety of damage, modification and removal with respect to the embedded information are called an attack to the embedded information. By manipulating digital contents to which content information is embedded, the embedded information signal is removed or made to be undetectable. Also, by making a fraud embedded information, the copyright and property right may not be claimed. These attacks are called a PAT attack.

Therefore, the development and design of the PAT require the checking of various attacks (e.g., damage, modification and removal of the embedded information) and the evaluation as to whether the embedded information efficiently operates with respect to various attacks.

A StirMark, a CertiMark, and a CheckMark are most widely used as PAT evaluating methods. Since these methods are an evaluation tool for still images, they are difficult to apply to video images.

The evaluation of the video PAT is performed in terms of a visibility evaluation, a robustness evaluation, and a capacity evaluation. For now, the method for evaluating the video PAT with respect to various attacks is not perfect. Also, since it is very difficult to satisfy all requirements of the evaluation, it is preferable that the video PAT should be evaluated according to the use cases and objects of the video PAT.

In addition, it is preferable that the evaluation and certification of the video PAT should be objectively achieved and the stability and mutual reliability of the evaluation result should be secured by repeating the evaluation procedures of various video PATs and testing several times the performance of video PAT products. For this purpose, it is efficient to automate the video PAT evaluation/certification procedures. Also, there is a demand for methods for allowing researchers and developers of laboratories, product developers of industries, and consumers to easily access the evaluation/certification engine of the certification authority through the Internet and to evaluate the video PAT.

Disclosure

Technical Problem

It is, therefore, an object of the present invention to provide a system and method for evaluating and certifying video PAT software, including a module for embedding the related information into the video image data and detecting the embedded information.

Other objects and advantages of the present invention can be understood more fully through the embodiments of the present invention. Also, the objects and advantages of the present invention can be easily implemented by means of the following claims and combination thereof.

Technical Solution

In accordance with one aspect of the present invention, there is provided a system for evaluating and certifying video PAT software, including: a receiving module for receiving video PAT software and a certificate application associated with the video PAT software; a setting module for setting an evaluation environment according to use cases of the PAT software received through the receiving module; an embedding module for embedding predetermined information into a test video image data using an embedder of the received video PAT software; an attack module for attacking the test video image data with the embedded information through various attack tools and generating an attacked video image data; a detecting module for detecting the embedded information from the attacked video image data by using a detector of the received video PAT software; an evaluating module for evaluating statistic information about reliability of the video PAT software from the detected information; and a certificate generating module for generating a certificate containing the evaluated statistic information.

Also, the system may further include a transfer module for transferring the generated certificate to an external certification application authority.

In accordance with another embodiment of the present invention, there is provided a method for evaluating and certifying video PAT software, including the steps of: receiving a video PAT software, which is target of the evaluation and certification, and a certification application associatied with the video PAT software from an external certification application authority; setting evaluation environments according to use cases of the received video PAT software; embedding predetermined information into a test video image data using an embedding algorithm contained in the received video PAT software; generating an attacked video image data by attacking the test video image data with the embedded information through various attack tools; detecting the embedded information from the attacked video image data using a detection algorithm contained in the received video PAT software; evaluating statistic information about reliability of the video PAT software using the detected result; and generating a certificate with the evaluated reliability statistic information.

The method may further include the step of transferring the generated certificate to the external certification application authority.

Advantageous Effects

In accordance with the present invention, the performance of an existing or future PAT related technologies can be compared and analyzed objectively and systematically. Therefore, technology developers can develop excellent watermarking technologies, users can select desired technologies, and evaluators can fairly evaluate PAT software.

Also, mutual reliability can be improved by objectively and systematically the performance of an existing or future PAT related technologies. Therefore, it is possible to efficiently support the commercialization of the digital contents field due to the new growth power industries planned by the government.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
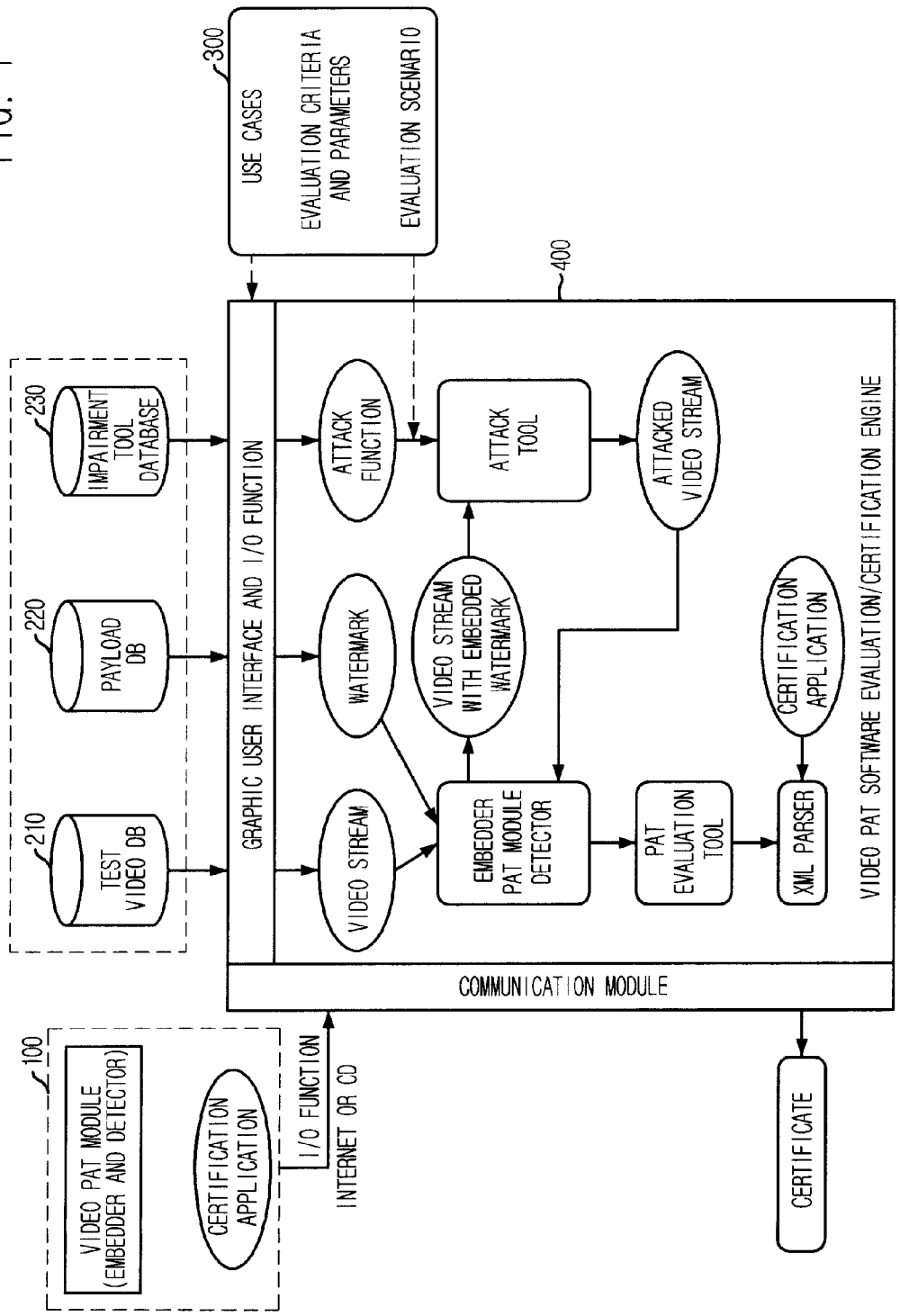
FIG. 1 is a diagram of a system for evaluating and certifying video PAT software in accordance with an embodiment of the present invention.

FIG. 1 is a diagram of a system for evaluating and certifying video PAT software in accordance with an embodiment of the present invention.

Referring to FIG. 1, the system of the present invention includes a receiving module, a setting module, an embedding module, an attack module, a detecting module, an evaluating module, and a certificate generating module. The receiving module receives video PAT software and a certificate application associated with the video PAT software. The setting module sets an evaluation environment according to use cases of the PAT software received through the receiving module. The embedding module embeds predetermined information into a test video image data using an embedder of the received video PAT software. The attack module attacks the test video image data with the embedded information through various attack tools and generates an attacked video image data. The detecting module detects the embedded information from the attacked video image data by using a detector of the received video PAT software. The evaluating module evaluates statistic information about the reliability of the video PAT software from the detected information. The certificate generating module generates a certificate containing the evaluated statistic information.

Also, the system of the present invention further includes a transfer module for transferring the generated certificate to an external certification authority (certification applicant).

A detailed structure and operation of the respective components will be described below with reference to FIGS. 1 to 6.

Referring to FIG. 1, an applicant for the evaluation/certification of the video PAT software transmits and files the certificate application and the video PAT module (or software module) 100, based on the interface and communication protocol defined by the certificate authority, to the certification authority through the Internet or the like.

The certification authority (video PAT software evaluation/certification engine) 400 embeds PAT information of a set payload database (220) into video images of a test video database 210 by using the embedder (embedding algorithm) of the filed video PAT module 100. If necessary, the certification authority 400 provides the use cases suitable for the filed video PAT module (product) 100, such that the evaluation environment 300 (e.g., evaluation standard, evaluation item, and evaluation scenario) can be automatically set. The evaluation environment can also be varied depending on an input or selection input of the user. Then, the attacked video image is generated by attacking the filed video PAT module 100 using various attack algorithms of an impairment tool database 23. Using the detector (detection algorithm) of the video PAT module 100 filed by the certification applicant, the embedded PAT information is detected from the attacked video stream and the statistic information about the reliability is evaluated. The certification authority 400 adds information of a calculation complexity and capacity of the video PAT module 100 to the certificate together with the reliability information and then transfers it to the certification application authority (certification applicant).

Figure 2:
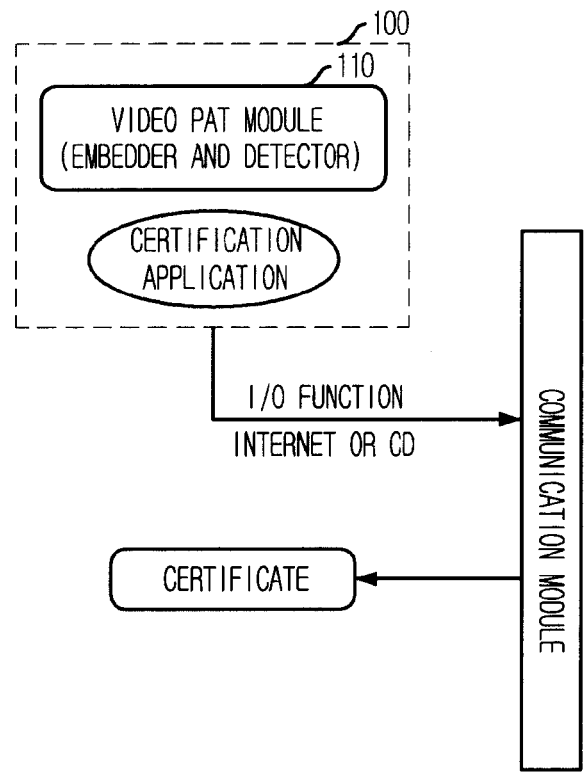
FIG. 2 is a diagram of a video PAT software evaluation/certification part in accordance with an embodiment of the present invention.

FIG. 2 is a diagram of the video PAT software evaluation/certification application part in accordance with an embodiment of the present invention.

The video PAT module can be divided as follows: a robust watermarking in which the embedded information of the contents can endure an external attack; a transaction watermarking in which a purchase information is added to the contents and thus a corresponding purchaser can be tracked when the contents are illegally duplicated; a fragile watermarking that provides the certification and integrity by detecting a corresponding portion when the contents are damaged, counterfeited or falsified; and a fingerprinting that investigates a correlation with a feature database of a previously registered owner and identifies the original owner by using feature information of the contents.

The certification application authority transfers the certification application and the video PAT module (or software module) 100 based on the interface and communication protocol defined by the certification authority through the Internet to the certification authority 400. The certification application contains information of the certification authority, information of the certification applicant, and general information of the video PAT module (product) like Table 1 below.

TABLE 1

| Certification Application Form | | |
|---|---|---|
| Info. Of certification authority | Name | Legal entity name |
| | Address | Zip code and detailed address |
| | Serial number | Unique number for identifying certification authority |
| Info. Of certification applicant | Name | Natural person or legal entity name of PAT product's owner |
| | Address | Zip code and detailed address |
| | ID | Residence registration number/business registry number for identifying PAT product's owner |
| General info. of video PAT product's owner | Patent (optional) | Patent information of PAT product (optional) |
| | Kind of PAT (optional) | Algorithm information of PAT product (robust watermarking, transaction watermarking, fragile watermarking, fingerprinting) |
| | Use cases | Protection of copyright, protection of duplication, broadcasting monitoring, device control, data certification, duplication control, fingerprinting, etc. |
| | ID of PAT product | Unique number assigned by certification authority for identifying PAT product |

The certification authority (video PAT software evaluation/certification engine) 400 performs the evaluation according to the evaluation criteria and parameters requested by the certification applicant or defined by the certification authority, creates the certificate according to a separate certificate form, and transfers the created certificate to the certification applicant through the Internet.

In another embodiment of the present invention, the transfer of the video PAT module and the certificate between the certification applicant and the certification authority can also be achieved mail or visit.

Figure 3:
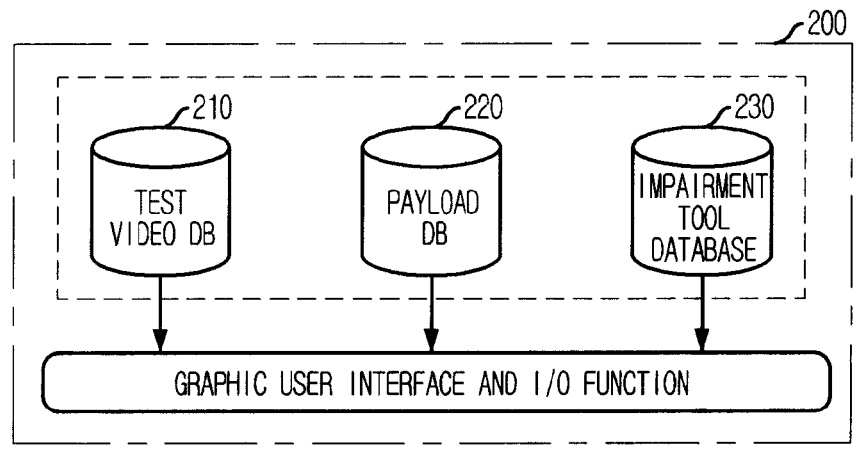
FIG. 3 is a diagram of video PAT software evaluation test databases in accordance with an embodiment of the present inventions.

FIG. 3 is a detailed diagram of the video PAT software evaluation test databases in accordance with an embodiment of the present invention.

The test video database 210 selects video images according to a frequency domain, a spatial domain, and a motion vector. The frequency domain classifies test sequences according to energy distribution. In the evaluation, a sequence satisfying a corresponding item is selected as the test video image. In the spatial domain, the test video image is selected according to the image complexity. The motion vector is the most important criteria discerning the still image and the video image.

The payload database 220 is data that is embedded into the contents and selected as information of various kinds and sizes according to the test video database 210.

The impairment tool database 230 includes various software algorithms for impairing the information embedded into the contents and is divided into a video compression, a digital-to-analog/analog-to-digital (DA/AD) conversion, a frame modification, a format conversion, and a geometric modification.

The databases 210 to 230 may be reconfigured according to the PAT evaluation specialist tool 300, such as use cases, an evaluation criteria and parameter, and evaluation scenario, and transfers information to the video PAT software evaluation/certification engine 400 through the predefined graphic user interface and input/output (I/O) function.

Figure 4:
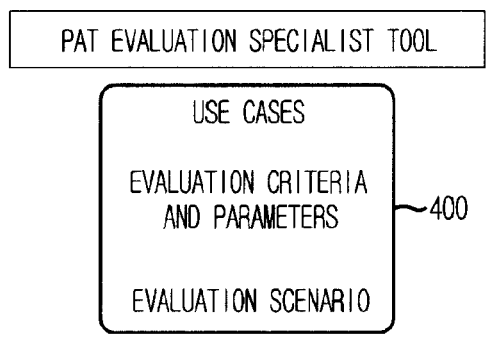
FIG. 4 is a diagram of the video PAT software evaluation supporting part in accordance with an embodiment of the present invention.

FIG. 4 is a detailed diagram of the video PAT software evaluation supporting part in accordance with an embodiment of the present invention.

The user cases of the video PAT include protection of copyright, protection of duplication, broadcasting monitoring, device control, data certification, duplication control, fingerprinting, and so on. The evaluation criteria and parameters can be automatically set variously according to the use cases.

Meanwhile, regarding the attack function or the evaluation parameters, the selection criteria may be widened and complicated according to the use cases and may be changed even during the evaluation.

The support system for the video PAT evaluation requires additional tools and environments as follows:
1) Classification of the use cases of the video PAT
2) Setting of the evaluation criteria suitable for the use cases
3) Evaluation environment (signal processing, database tool)
4) Development of the statistic processing methodology and environment (using the spreadsheet, statistic processing package, etc.)

The support system for the video PAT evaluation allows even the evaluation applicant or non-experts to set the evaluation environment.

Figure 5:
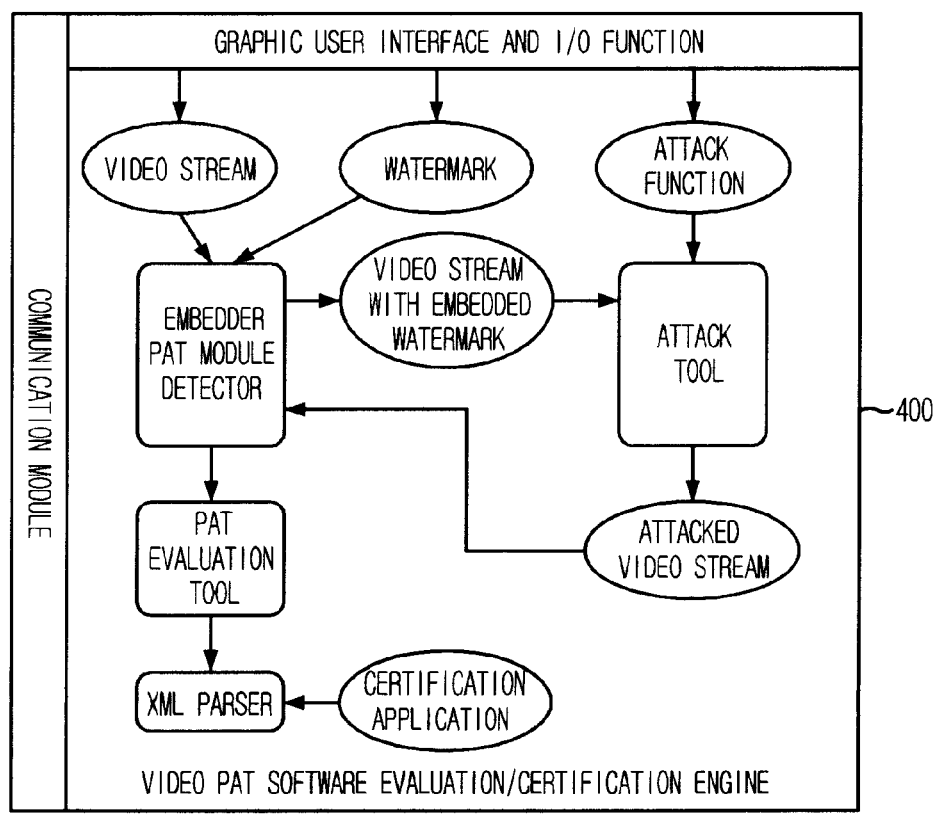
FIG. 5 is a diagram of a video PAT software evaluation/certification engine in accordance with an embodiment of the present invention.

FIG. 5 is a detailed diagram of the video PAT software evaluation/certification engine in accordance with an embodiment of the present invention.

Referring to FIG. 5, the video PAT software evaluation/certification engine 400 performs an actual evaluation according to the set evaluation environment, statistically processes the result through the PAT evaluation tool, and generates the certificate containing the processed statistics. That is, the certification authority tests (evaluates) the performance of the video PAT module (or the software module) 100, which is received from the certification applicant, under the evaluation environment according to the test video, payload information, attack function, evaluation criteria and parameters, and evaluation scenario. Then, the certification authority creates the result according to the certificate form and transfers it.

Figure 6:
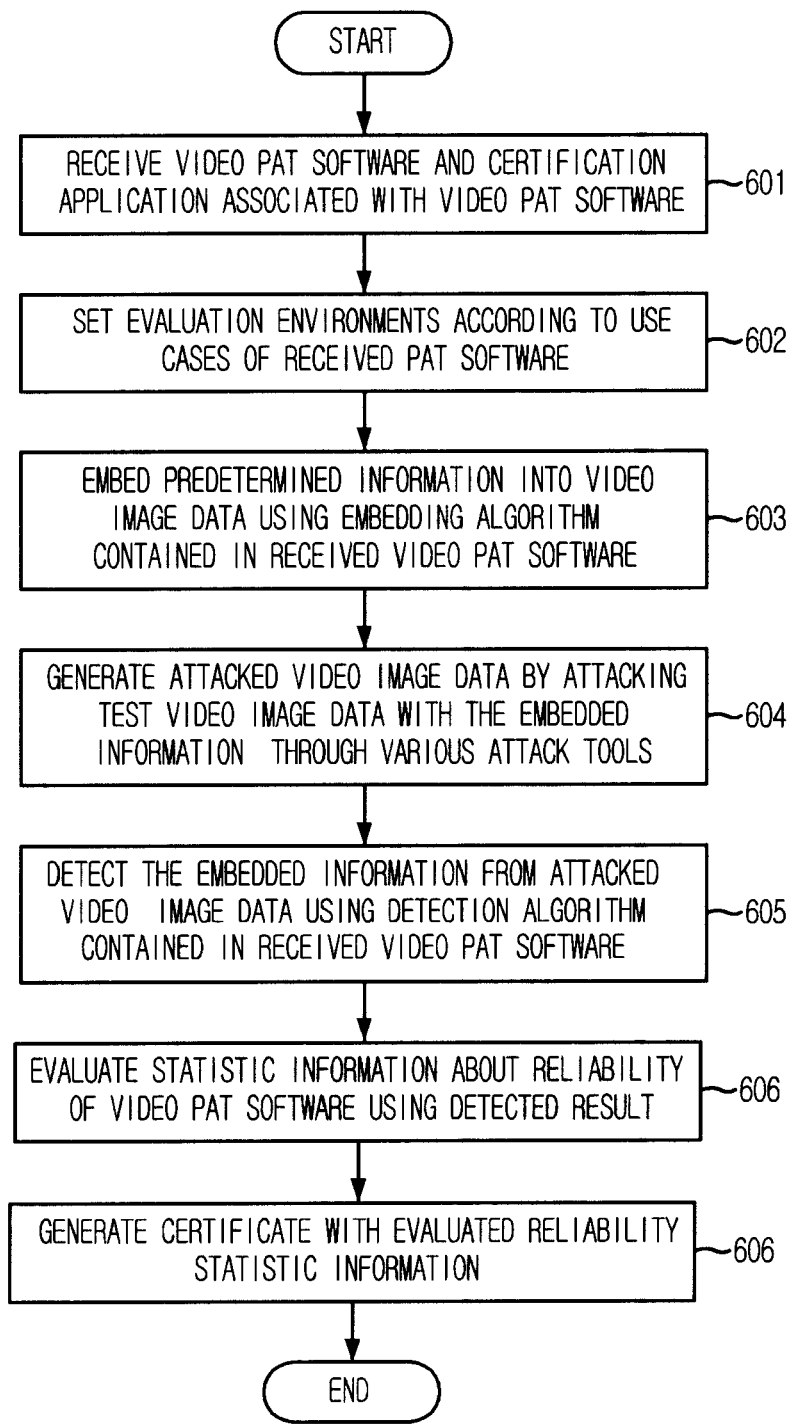
FIG. 6 is a flowchart illustrating a method for evaluating and certificating video PAT software in accordance with an embodiment of the present invention.

FIG. 6 is a flowchart illustrating a method for evaluating and certifying the video PAT in accordance with an embodiment of the present invention.

In step 601, the video PAT software, which is the target of the evaluation and certification, and the certification application associated with the video PAT software are received from the external certification application authority (certification applicant).

In step 602, the evaluation environments (evaluation database, attack function, evaluation criteria and parameters, evaluation scenario, etc.) according to the use cases of the received video PAT software are automatically set.

In step 603, the predetermined information (PAT information of the payload database) is embedded into the test video image data using the embedder (embedding algorithm) contained in the received video PAT software. In step 604, the attacked video image data is generated by attacking the test video image data with the embedded information through various attack tools.

In step 605, the embedded information is detected from the attacked video image data using the detector (detection algorithm) contained in the received video PAT software.

In step 606, the statistic information about the reliability of the video PAT software is evaluated using the detected result.

In step 607, the certificate with the evaluated reliability statistic information is generated and transferred to the external certification application authority (certification applicant).

The above-described methods in accordance with the present invention can be stored in computer-readable recording media. The computer-readable recording media may include CDROM, RAM, ROM, floppy disk, hard disk, optical magnetic disk, and so on. Since these procedures can be easily carried out by those skilled in the art, a detailed description thereof will be omitted.

While the present invention has been described with respect to certain preferred embodiments, it will be apparent to those skilled in the art that various changes and modifications may be made without departing from the scope of the invention as defined in the following claims.

What is claimed is:

1. A system for evaluating video PAT (persistent association technologies) software, the system comprising:
    a processor;
    a receiving module for receiving video PAT software, the video PAT software being a target of evaluation and comprising an embedder and a detector;
    a setting module for setting an evaluation environment of the received video PAT software;
    an embedding module for embedding payload information into a test video image data using the embedder;
    an attack module for attacking the test video image data with the embedded payload information according to the evaluation environment and generating an attacked video image data;
    a detecting module for detecting the embedded payload information from the attacked video image data by using the detector; and
    an evaluating module for evaluating information about reliability of the video PAT software from the detected information.

2. The system as recited in claim 1, further comprising a certificate generating module generating a certificate from a certificate application of the video PAT software and the evaluated reliability information, wherein the certificate application video PAT software is received in the receiving module.

3. The system as recited in claim 2, further comprising a transfer module for transferring the generated certificate to an external certification application authority.

4. The system as recited in claim 2, wherein the evaluation environments includes evaluation database, attack function, evaluation criteria and parameters, and evaluation scenario according to the use cases of the received video PAT software.

5. A computer implemented method for evaluating video PAT software, comprising the steps of:
    receiving video PAT software, which is a target of the evaluation and includes an embedding algorithm and a detection algorithm;
    setting an evaluation environment of the received video PAT software;
    embedding payload information into a test video image data using the embedding algorithm;
    generating, by a processor, an attacked video image data by attacking the test video image data with the embedded payload information according to the evaluation environment;
    detecting the embedded payload information from the attacked video image data using the detection algorithm;
    evaluating information about reliability of the video PAT software using the detected information.

6. The computer implemented method as recited in claim 5, further comprising the steps of:
    receiving a certificate application of the video PAT software; and generating a certificate based on the certificate application of the video PAT software and the evaluated reliability information.

7. The computer implemented method as recited in claim 6, further comprising the step of transferring the generated certificate to the external certification application authority.

8. The computer implemented method as recited in claim 6, wherein the evaluation environments includes evaluation database, attack function, evaluation criteria and parameters, and evaluation scenario according to the use cases of the received video PAT software.

* * * * *